Patented May 1, 1923.

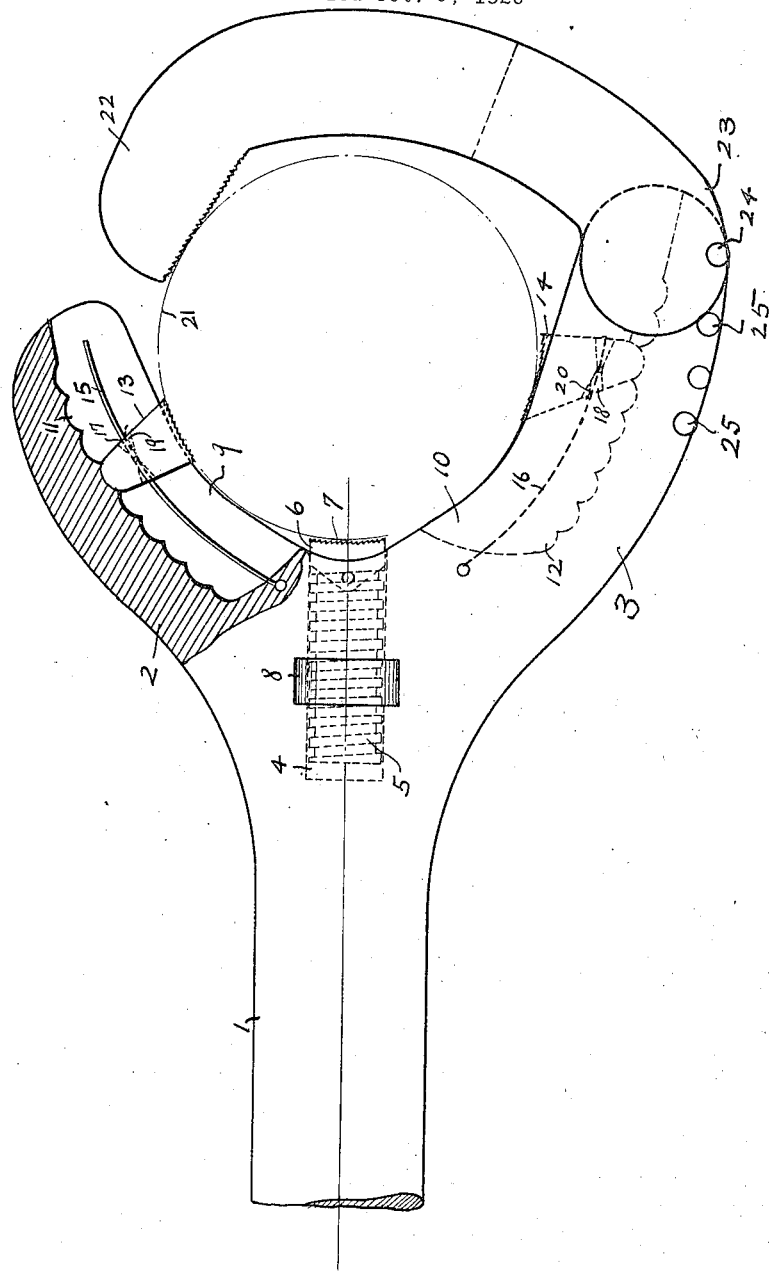

1,454,016

UNITED STATES PATENT OFFICE.

BUFORD J. STEEN, OF CHRISTINE, TEXAS.

PIPE WRENCH.

Application filed October 5, 1920. Serial No. 414,805.

*To all whom it may concern:*

Be it known that I, BUFORD J. STEEN, a citizen of the United States, residing at Christine, in the county of Atascosa and State of Texas, have invented certain new and useful Improvements in a Pipe Wrench, of which the following is a specification.

This invention relates to new and useful improvements in a pipe wrench.

One object of the invention is to provide a wrench of the character described specially adapted for handling pipe and for screwing and unscrewing the same, and which is adjustable so that it may be accommodated to pipes of all sizes.

With the above and other objects in view the invention has particular relation to certain novel features of construction, arrangement of parts and use, an example of which is given in this specification and illustrated in the accompanying drawings, wherein:—

Figure 1 shows a plan view of the wrench, shown partially broken away.

Referring now more particularly to the drawings, the numeral 1 refers to the wrench handle, whose operative end is formed into the arcuate jaws 2 and 3, of a contour to fit around pipe. Between these jaws there is a deep socket 4 in the handle, in which there is fitted the shank 5 of the dog 6, said dog being pivoted to said shank, and its outer end being serrated forming the teeth 7. The shank 5 is threaded through the adjusting nut 8 of the usual construction, which has a bearing in the handle. By turning this nut, the dog 6 may be projected out from or withdrawn into the socket 5. The inner sides of the jaws 2 and 3 have deep oblong grooves 9 and 10, the bottom of each groove being formed into bearing seats 11 and 12, and the pipe-engaging dogs 13 and 14, respectively, are mounted in said slots, their inner ends being formed to fit in said bearings, and their outer ends being serrated to engage with the pipe. These dogs 13 and 14 are adjustable so as to engage with pipes of different sizes. For the purpose of adjusting them, flexible rods 15 and 16 are provided, which are fastened at their inner ends to the respective jaws 2 and 3 and they extend through the bearings 17 and 18 through said dogs. These bearings are flared each way, as shown, so as to give the dogs free movement on said rods. Flat springs 19 and 20 are attached to the respective dogs 13 and 14 and press against the corresponding rods 15 and 16 and tend to hold said dogs into engagement with the pipe 21.

A pipe-engaging claw 22 is provided, one end of which is bifurcated, forming the fingers 23, 23, which embrace the jaw 3 and which is adjustable thereon so that it may be accommodated to different sizes of pipe. This claw is anchored to the jaw 3 by means of a bearing pin 24, which engages in suitable bearings 25 in the periphery of the jaw 3.

It is obvious that the pipe-engaging dogs 6, 13 and 14 may be readily adjusted toward each other for the purpose of engagement with small pipe, or from each other for the purpose of engaging with large pipe, and the pipe-engaging claw 22 may be readily adjusted accordingly.

What I claim is:—

1. A wrench, including a handle, one end of which is formed with diverging jaws, said handle having a socket between the jaws, a dog mounted in said socket, means for adjusting said dog, the inner faces of said jaws having slots, a dog adjustably mounted in each slot, and a claw adjustably mounted on one of said jaws.

2. A wrench, including a handle, one end of which is formed with diverging jaws, said handle having a socket between the jaws, a dog adjustably mounted in said socket, the inner faces of said jaws having slots, a jaw adjustably mounted in each slot and formed with a bearing and flexible members fastened at one end to the respective jaws and extending through said bearings, and a claw pivoted to one of said jaws.

3. A wrench, including a handle, one end of which is formed with diverging jaws, a dog mounted between the jaws, the inner faces of said jaws having slots whose bottoms are formed with bearing seats, a dog adjustably mounted in each slot whose inner ends are formed to fit into said bearings and whose outer ends are formed to engage with a pipe, and a claw pivotally connected to one of said jaws.

In testimony whereof I have signed my name to this specification in the presence of two subscribing witnesses.

BUFORD J. STEEN.

Witnesses:
WM. A. CATHEY,
LORENA FABRENTBOLD.